(12) United States Patent
Kwok et al.

(10) Patent No.: US 11,368,934 B2
(45) Date of Patent: Jun. 21, 2022

(54) SYSTEM AND METHOD TO IMPROVE VERIFICATION OF 5G STATUS

(71) Applicant: T-Mobile USA, Inc., Bellevue, WA (US)

(72) Inventors: Ming Shan Kwok, Seattle, WA (US); Wafik Abdel Shahid, Kenmore, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 73 days.

(21) Appl. No.: 16/903,818

(22) Filed: Jun. 17, 2020

(65) Prior Publication Data

US 2021/0400627 A1   Dec. 23, 2021

(51) Int. Cl.
*H04W 68/00*   (2009.01)
*H04W 24/08*   (2009.01)
*H04W 84/04*   (2009.01)
*H04W 88/06*   (2009.01)

(52) U.S. Cl.
CPC ........... *H04W 68/00* (2013.01); *H04W 24/08* (2013.01); *H04W 84/042* (2013.01); *H04W 88/06* (2013.01)

(58) Field of Classification Search
CPC ..... H04W 88/06; H04W 76/15; H04W 76/16; H04W 76/27; H04W 23/10
See application file for complete search history.

(56) References Cited

U.S. PATENT DOCUMENTS

2020/0389828 A1* 12/2020 Venkataraman .. H04W 36/0022
2021/0007025 A1*  1/2021 Kumar ................. H04W 36/14

* cited by examiner

*Primary Examiner* — Jamal Javaid
(74) *Attorney, Agent, or Firm* — Lee & Hayes, P.C.

(57) ABSTRACT

A network indicator symbol may be presented on a display of a communication device to indicate a level of service currently supported by the communication device over a network to which the communication device is presently connected. Displaying the network indicator symbol sets the user's expectations for what types of services are currently supported. In some examples, the communication device may determine an appropriate network indicator symbol based on the device capabilities, the capabilities of the base station to which the communication device is connected, and the capabilities of neighing stations to the base station to offer E-Utran New Radio-Dual Connectivity based services.

17 Claims, 8 Drawing Sheets

SYSTEM AND METHOD TO IMPROVE
VERIFICATION OF 5G STATUS

BACKGROUND

Communication devices, such as smartphones, often have a status bar that shows, among other things, the current signal strength and/or signal quality of the current wireless connection with a base station. In addition, the status bar may have a network indicator, such as an icon or symbol, that indicates the type of network (or the type of air interface technology) being used for the current wireless connection. For example, the network indicator might comprise a "WCDMA" symbol, "WiFi" symbol, "3G" symbol, a "4G" symbol, a "4G LTE" symbol, a "LTE" symbol, a "5G" symbol, a "5G-NR" symbol, a "5G LTE" symbol, and the like. These network indicators are conventionally displayed by the user equipment based on a state of a single bit indicator of a broadcast message received by the user equipment as part of the process of establishing a connection to an anchor cell station. However, in various situations, the user equipment may be incompatible with the various types of network and network indicator displayed may not accurately represent the connectivity status of the user equipment.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

Described herein are techniques for determining which of multiple different service type symbols or network indicators to present on a display (e.g., in the status bar) of a communication device, when the communication device is operating in a network (e.g., a cellular network) of a wireless communications provider. These service type symbols are indicative of particular types of services, and, when a given symbol is presented on the display of the communication device, the symbol may indicate to the user of the communication device that a type of service corresponding to the displayed symbol is supported by the communication device and a corresponding base station over a network to which the communication device is presently connected. Accurately displaying the network indicator symbol sets the user's expectations for what types of services are currently supported and what types of services are currently unsupported.

As used herein, a type of service is "supported" on (or by) a communication device and corresponding base stations (such as an anchor cell and neighbor cells of a network system) if the type of service may be accessed via the communication device at or above a predetermined threshold quality level. For example, a status indicator symbol may be displayed corresponding to a highest or fastest level of service currently supported between the communication device and the corresponding base stations. In this manner, the communication device may display network connectivity symbols, such as "3G" symbol, a "4G" symbol, a "4G LTE" symbol, a "LTE" symbol, a "5G" symbol, a "5G-NR" symbol, a "5G LTE" symbol, and the like, based on a current highest or fastest connectivity level supported between the communication device and the corresponding base stations.

In some implementations, the system discussed herein may receive a System Information Block (SIB) message from a base station when establishing the base station as an anchor cell of a Long-Term Evolution (LTE) Evolved Node B (eNB) communication connection between the communication device and the network. In some instances, the SIB 2 message may include a bit (e.g., an Upper Layer Indication bit) that indicates or represents that the base station acting as the eNB (e.g., anchor cell) for the communication connection to the network can support E-Utran New Radio-Dual Connectivity (ENDC). However, unlike conventional systems that's rely solely on the Upper Layer Indication bit in determining which network indicator symbols (e.g., "4G", "LTE", "5G", "5G LTE", and the like), the communication device, discussed herein, may also be configured to determine a frequency band associated with the eNB of the ENDC connections accessible to the communication device. The communication device may then determine if the communication device is equipped or configured to utilize an ENDC communication connection having an eNB operating within or at the determined frequency band. In some cases, the eNB may provide or send the frequency band information to the communication device in association with the SIB message. In these implementations, the communication device may display the "LTE 5G" network indicator symbol in response to determining that at least one ENDC connection having an eNB operating at or within the frequency band is supported by the communication device.

In other implementations, the eNB may retrieve, capture, obtain, and/or store a neighbor list that may be provided or otherwise shared with the communication device in association with the SIB message. The neighbor list may include a list indicating frequencies and capabilities associated with each neighbor base station that may potentially form an ENDC connection with the communication device via the eNB.

The communication device may compare the neighbor list with the capabilities of the communication device itself to determine if the communication device is capable of establishing and maintaining an ENDC connection with any of the neighbor base stations utilizing the eNB acting as the anchor cell. For example, an application processor operating on the communication device may query capabilities of a modem of the communication device and compare the results of the query to the neighbor list. In the case of a match, the communication device may establish the "5G LTE" connection and cause the "5G LTE" network indicator symbol to be displayed to the user in device's status bar.

Accordingly, the techniques described herein provide a user of a communication device with more clarity regarding the level of service and connectivity currently supported between the communication device and the network. This improved clarity results in improved user expectations and satisfaction by reducing misunderstandings associated with the level of service the user can expect at the current moment. For example, if the communication device lacks the capabilities to utilize the ENDC connection of the neighboring base stations, the communication device may display the "LTE" network indicator symbol rather than the "5G LTE" network indicator symbol, setting the user's expectations of a lower level of service unlike the conventional systems, which may inaccurately represent to the user that the user is receiving a higher level of service than is available at the moment.

Although the techniques and systems described herein are often described in the context of ENDC, LTE, and 5G networks, the techniques described herein may also be used with different network types, standards, and technologies. That is, the techniques may be used more generally for first and second wireless communication networks (and possibly additional networks), such as where a LTE network is an example of the first wireless communication network and a 5G network is an example of the second wireless communication network.

The systems, devices, and techniques described herein can improve the functioning of a device (e.g., a communication device, a base station, etc.) by more accurately presenting network indicator symbols. In this manner, the techniques discussed herein can improve a user experience by appropriately setting user experience expectations for the functional operation of client applications, cloud-services, and related processes on the communication device. In some cases, the techniques and systems described herein may improve the functioning of a network by reducing initiation of communications where network resources are not supported, which may reduce signaling and associated congestion. These and other improvements to the functioning of a computer and network are discussed herein.

Figure 1:
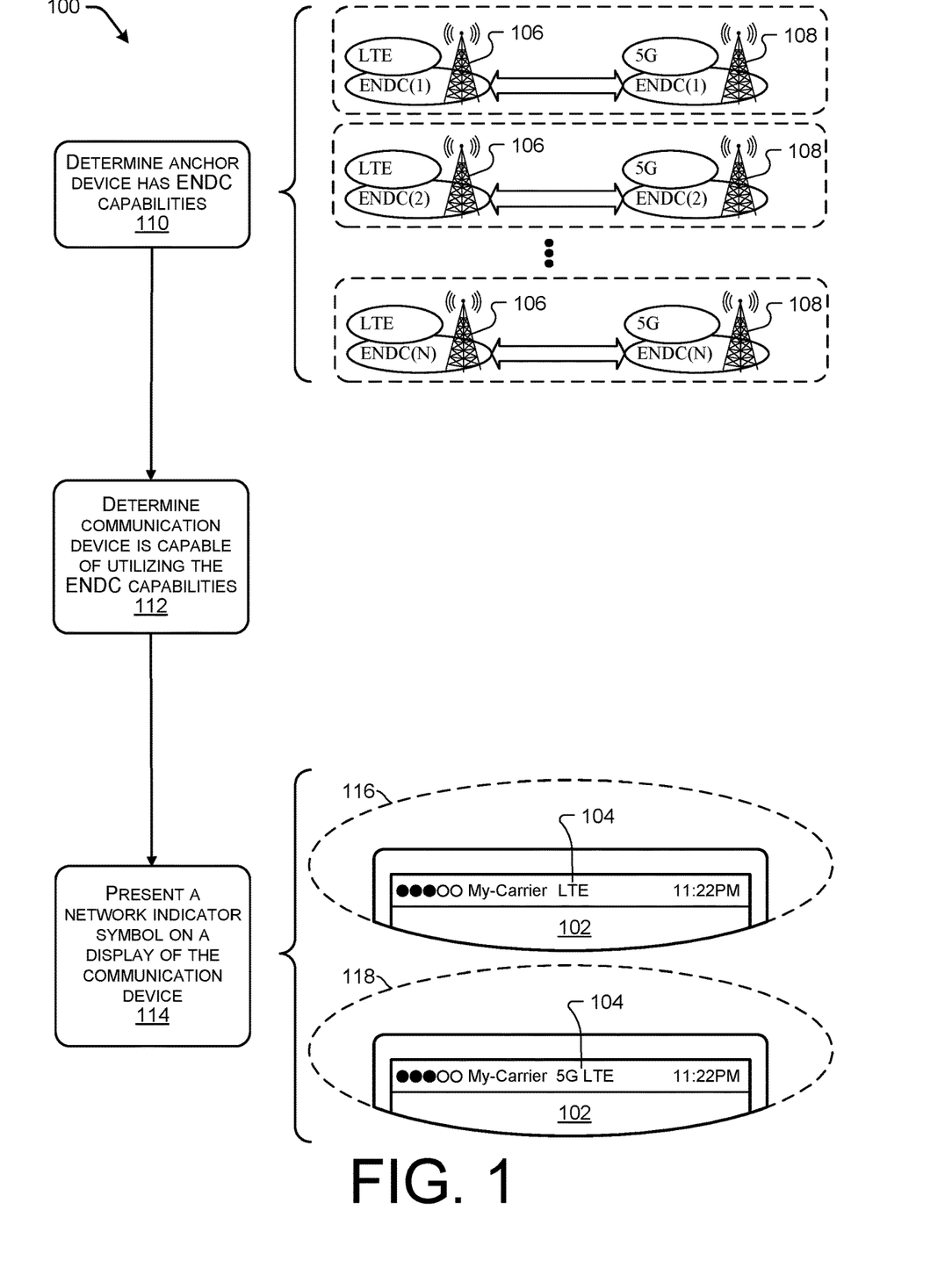
FIG. 1 illustrates a pictorial flow diagram for presenting, on a display of a communication device, network indicator symbol indicating a level of service currently available to a user of the communication device, according to some implementations.

FIG. 1 illustrates a pictorial flow diagram 100 for presenting, on a display of a communication device 102, network indicator symbol 104 indicating a level of service currently available to a user of the communication device 102, according to some implementations. For instance, as discussed herein, in some cases, the communication device 102 may communicatively connect to a base station or cell that is capable of acting as an anchor cell or eNB for an ENDC connection to a neighbor base station. For example, a first base station 106 (e.g., the LTE connected device) may act as the eNB node (e.g., the anchor or master node) with respect to a second base station 108 that may act as a gNB (e.g., the 5G node). In this manner, the communication device 102 may in some cases access both the LTE and the G5 networks or connections simultaneously. In some instances, the communication device 102 may even access both the LTE and the 5G networks simultaneously using the same frequency or spectrum bands.

At operation 110, the communication device 102 may determine the anchor device 106 has ENDC capabilities. For example, the anchor device 106 may send a SIB message including an indication that the device 106 may act as the eNB for one or more ENDC connections. The communication device 102 may also receive a frequency band at which the anchor device 106 is operating with respect to the ENDC connection. In other examples, the communication device 102 may receive a neighbor list including a list of the frequencies and capabilities of any neighbor stations (e.g., stations 108) that may server as the gNB node of the ENDC connection.

At operation 112, the communication device 102 may determine that the communication device 102 is capable of utilizing at least one of the ENDC connections available via the anchor device 106. For example, if the communication device 102 receives the operating frequency band of the eNB device 106 and the communication device 102 is capable of connecting to at least one ENDC network having an eNB operating at the frequency band, then the communication device 102 may determine that the device 102 is capable of utilizing the ENDC capabilities available via the anchor device 106. In another example, the communication device 102 may determine if the communication device 102 is equipped to connect to any of the gNB device 108 using any of the frequencies and/or capabilities indicated in the neighbor list. For instance, the communication device 102 may query capabilities of a modem onboard the communication device 102 and compare the results of the query to entries of the neighbor list. In the case of a match between at least one entry of the neighbor list and the results, the communication device 102 may determine that the communication device 102 is capable of utilizing the ENDC capabilities available via the anchor device 106.

At operation 114, the communication device 102 may present a network indicator symbol on a display of the communication device. The network indicator symbol that is displayed may depend upon the determination at operation 112. For example, if the communication device 102 determined that the communication device 102 is capable of utilizing the ENDC capabilities available via the anchor device 106, the communication device 102 may display the "5G LTE" network indicator symbol, as shown in 116. Otherwise, the communication device 102 may display the network indicator symbol associated with the anchor device 106, such as "LTE" in the illustrated example and as shown by 118.

Additionally, or alternatively, although not depicted in FIG. 1, the operation at 112 can include determining a capabilities of communication device 102 or the modem to which the device 102 is connected, and the like. For example, the capability of the device 102 may be based on a particular radio chip associated with the communication device 102 and its known capabilities, etc. A modem being used by the device 102 to connect to the network may likewise have capability limitations that dictate which types of services might be supported on the communication device 102.

Figure 2:
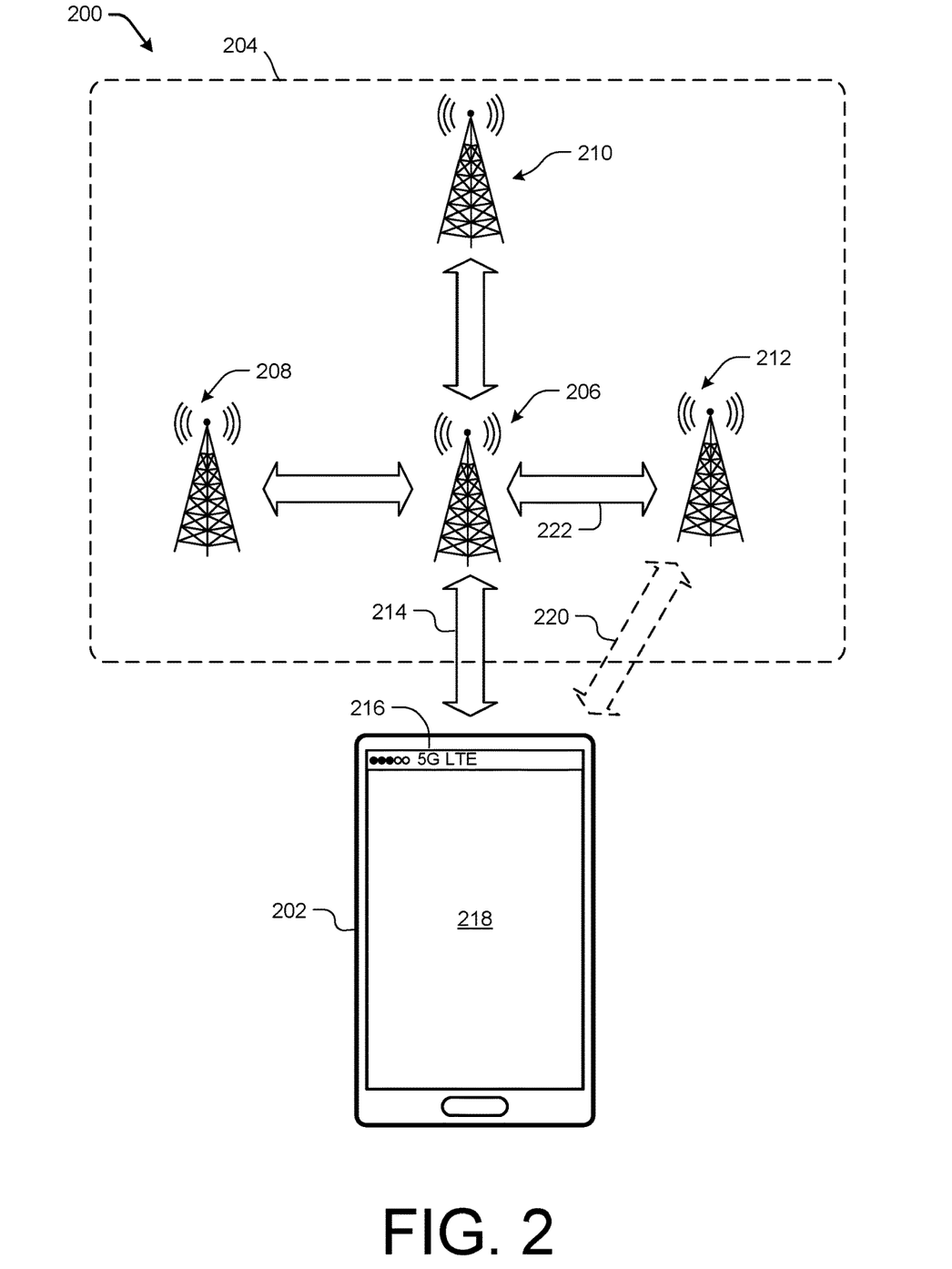
FIG. 2 illustrates a pictorial diagram of a communication device accessing the network via a Long-Term Evolution Evolved Node B capable base station and displaying a network indicator symbol indicating a level of service currently available to a user of the communication device, according to some implementations.

FIG. 2 illustrates a pictorial diagram 200 of a communication device 202 accessing the network, generally indicated by 204, via an LTE eNB capable base station 206 and displaying a network indicator symbol 216 indicating a level of service currently available to a user of the communication device 202, according to some implementations. For example, the network device 206 may support ENDC connections with one or more neighboring cells or base stations, illustrated as base stations 208-212. In some cases, the base station 206 acting as the eNB device may retrieve, request, or otherwise obtain from the neighbor base stations 208-212 data useable to generate a neighbor list associated with the various ENDC capabilities. In some cases, the neighbor list may include operating frequencies for the ENDC connections as well as other requirements, capabilities, and/or configurations associated with each individual ENDC of the neighboring stations 208-212.

In the illustrated example, the communication device 202 may establish an LTE connection 214 to the base station 206. As part of establishing the LTE connection 214, the communication device 202 may receive a SIB message indicating that the base station 206 can support acting as an eNB cell for one or more ENDC connections. In some cases, the communication device 202 may also receive a frequency band at which the base station 206 may operate when performing eNB cell operations. The communication device 202 may then determine if the communication device 202 is capable of connecting to at least one ENDC having an eNB device (e.g., anchor cell) operating at the specified frequency band. If so the communication device 202 may display the "5G LTE" network indicator symbol 216 on a display 218 of the device 202, as shown.

In another example, the base station 206 may also provide the communication device 202 with the neighbor list. The communication device 202 may then determine if the communication device 202 is capable of supporting a connection using one or more of the neighbor base stations 208-212 according to the contents of the neighbor list. If so, the communication device 202 may again display the "5G LTE" network indicator symbol 216. Otherwise, the communication device may display the "LTE" or other network indicator symbol representing the level of service associated with the connection 214.

In either example above, if the communication device 202 supports the ENDC connection using the base station 206 as the eNB device, the communication device 202 may establish a connection (such as a 5G connection) to a selected one of the neighbor base stations. For instance, in the illustrated example, the communication device 202 may form a 5G connection 220 with the neighbor base stations 212. In some cases, the communication device 202 may be unable to establish or maintain a connection to the neighbor base stations 212, such as when the neighbor base stations 212 is out of range of the communication device 202. In these cases, the communication device 202 may update the network indicator symbol 216, for instance to "LTE", when the connection is lost.

In the illustrated examples, the base station 206 (or access point) is implemented as an LTE, eNB, and/or master base station. Similarly, as illustrated, the base station 212 may act as the 5G access point and may be implemented as a New Radio (NR), gNB, slave, or secondary base station. In this arrangement, a network core may communicate with both the LTE base station 206 and the NR base station 208. In some implementation, radio communications are controlled by the LTE master base station 206 over the connection 222. It should be understood, that other communication paths may be used in other embodiments.

In some instances, the base station 206 is not limited to LTE technology and may be referred to generally as a first base station 206. In some instances, the NR base station 208 is not limited to NR technology, and may be referred to generally as a second base station 208. In some instances, depending on an implementation, the LTE base station 206 can be referred to as a master base station while the NR base station 208 can be referred to as a secondary base station. In some instances (e.g., in a MR-DC context), depending on an implementation (e.g., Option 4), the LTE base station 206 can be referred to as a secondary base station while the NR base station 208 can be referred to as a master base station.

Figure 3:
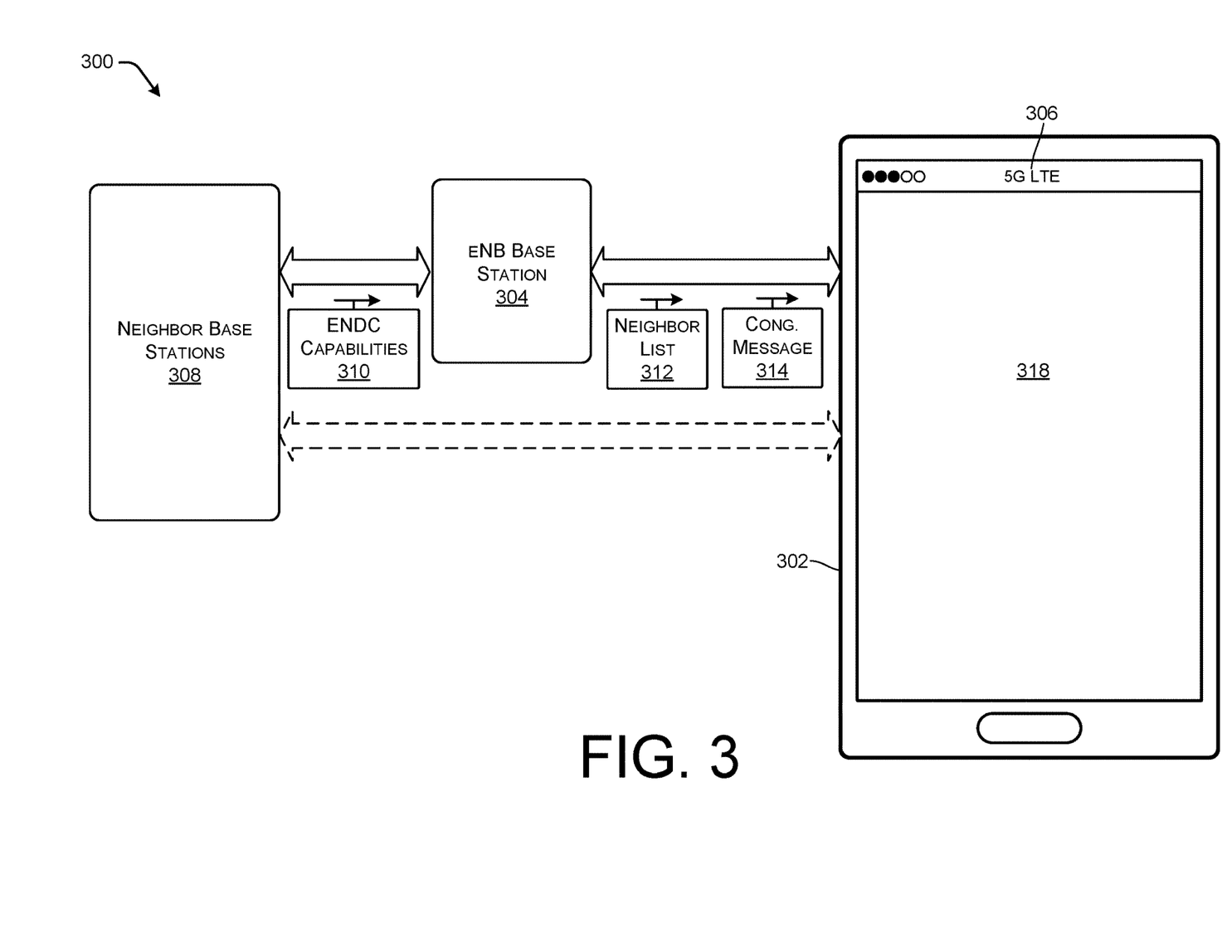
FIG. 3 illustrates a pictorial diagram of a communication device accessing a network via a Long-Term Evolution Evolved Node B capable base station and displaying a network indicator symbol indicating a level of service currently available to a user of the communication device, according to some implementations.

FIG. 3 illustrates a pictorial diagram of a communication device 302 accessing a network via an LTE eNB capable base station 302 and displaying a network indicator symbol 306 indicating a level of service currently available to a user of the communication device 302, according to some implementations. In the illustrated example, the eNB base station 304 may support ENDC connections with one or more neighboring cells or base stations 308, illustrated as base stations 208-212. In some cases, the base station 206 acting as the eNB device may retrieve, request, or otherwise obtain from the neighbor base stations 308 data or ENDC capabilities 310 useable to generate a neighbor list 312 associated with the various ENDC capabilities 310. In some cases, the neighbor list 310 may include operating frequencies for the ENDC connections as well as other requirements, capabilities, and/or configurations associated with each individual ENDC of the neighboring base stations 308, as discussed above.

In the illustrated example, the communication device 302 may receive a configuration message 314 (e.g., a SIB message) indicating that the base station 304 can support operating as an eNB with respect to the neighbor base stations 308. In some cases, the communication device 302 may also receive a frequency band at which the base station 304 may operate when performing eNB operations and/or the neighbor list 312. The communication device 302 may then determine if the communication device 302 is capable of connecting to at least one of the neighbor base stations 308 utilizing the base station 304 as an eNB device (e.g., anchor cell). If so the communication device 302 may display the "5G LTE" network indicator symbol 306 on a display 318 of the device 302, as illustrated.

In FIGS. 1-3, a single communication device is shown. However, it should be understood, that the communication device shown may be one of many such devices that are configured for use with the communication network. In accordance with various embodiments described herein, the terms "wireless communication device," "wireless device," "communication device," "cellular communication device," "mobile device," "computing device," "electronic device," "user device," and "user equipment (UE)" may be used interchangeably herein to describe any communication device 102 capable of performing the techniques described herein. In the described embodiment, the communication device(s) device(s) support LTE and NR radio access technologies and/or technologies for other 4G or 5G network. Accordingly, the communication device(s) may include an LTE radio that communicates wirelessly with a LTE base station or base station of the LTE network and an NR radio that communicates wirelessly with the NR or 5G base station or base station.

The communication device(s) may comprise any of various types of wireless cellular communication devices that are capable of wireless data and/or voice communications, including smartphones and other mobile devices, "Internet-of-Things" (IoT) devices, smart home devices, computers, wearable devices, entertainment devices, industrial control equipment, etc. Further examples can include, but are not limited to, smart phones, mobile phones, cell phones, tablet computers, portable computers, laptop computers, personal digital assistants (PDAs), electronic book devices, or any other portable electronic devices that can generate, request, receive, transmit, or exchange voice, video, and/or digital data over a network. Additional examples of communication devices include, but are not limited to, smart devices such as televisions, refrigerators, washing machines, dryers, smart mirrors, coffee machines, lights, lamps, temperature sensors, leak sensors, water sensors, electricity meters, parking sensors, music players, headphones, or any other electronic appliances that can generate, request, receive, transmit, or exchange voice, video, and/or digital data over a network.

In general, the communication device(s) can include any device that is capable of transmitting/receiving data wirelessly using any suitable wireless communications/data technology, protocol, or standard, such as Global System for Mobile communications (GSM), Time Division Multiple Access (TDMA), Universal Mobile Telecommunications System (UMTS), Evolution-Data Optimized (EVDO), Long Term Evolution (LTE), Advanced LTE (LTE+), New Radio (NR), Generic Access Network (GAN), Unlicensed Mobile Access (UMA), Code Division Multiple Access (CDMA), Orthogonal Frequency Division Multiple Access (OFDM), General Packet Radio Service (GPRS), Enhanced Data GSM Environment (EDGE), Advanced Mobile Phone System (AMPS), High Speed Packet Access (HSPA), evolved HSPA (HSPA+), Voice over IP (VoIP), VoLTE, Institute of Electrical and Electronics Engineers' (IEEE) 802.1x protocols, WiMAX, Wi-Fi, Data Over Cable Service Interface Specification (DOCSIS), digital subscriber line (DSL), CBRS, and/or any future Internet Protocol (IP)-based network technology or evolution of an existing IP-based network technology. The communication device 102 can implement enhanced Mobile Broadband (eMBB) communications, Ultra Reliable Low Latency Communications (URLLCs), massive Machine Type Communications (mMTCs), and the like.

The communication device(s) may communicate through either or both of LTE and the NR. In some instances, the communication device(s) may support ENDC communications, as discussed above and in which a single communication session might simultaneously use both a 5G connection and a 4G or LTE connections. More specifically, the communication device 102 may operate using what is referred to as a Non-Standalone Architecture (NSA), using 5G radio technologies to augment LTE and/or 4G communication capabilities. When using NSA, the communication device(s) can use both an LTE carrier and an NR carrier for downlink data reception and uplink transmissions.

Figure 4:
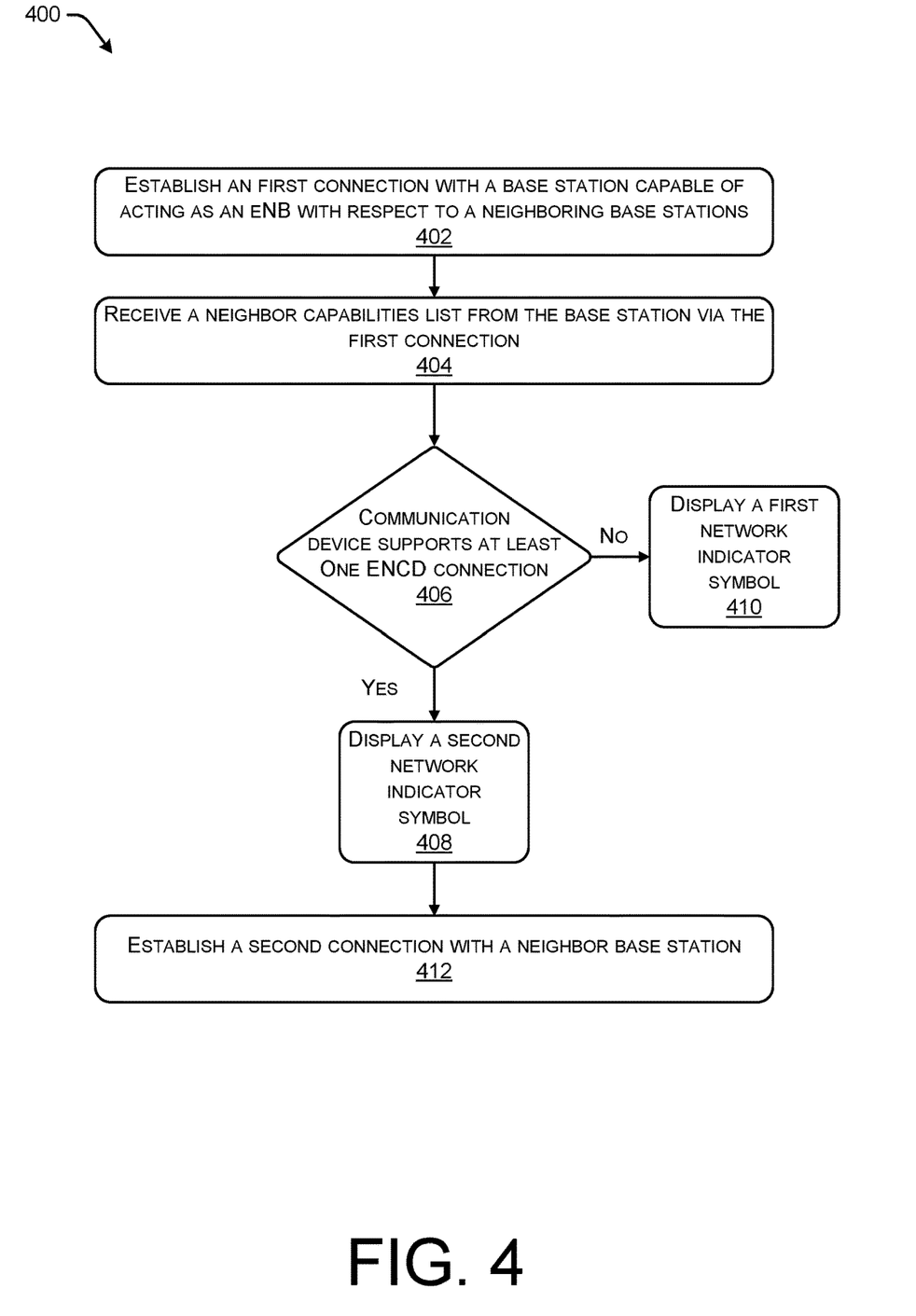
FIG. 4 is an example process implemented by a communication device for displaying a network indicator symbol indicative of a level of service currently available to a user of the communication device, according to some implementations.
Figure 5:
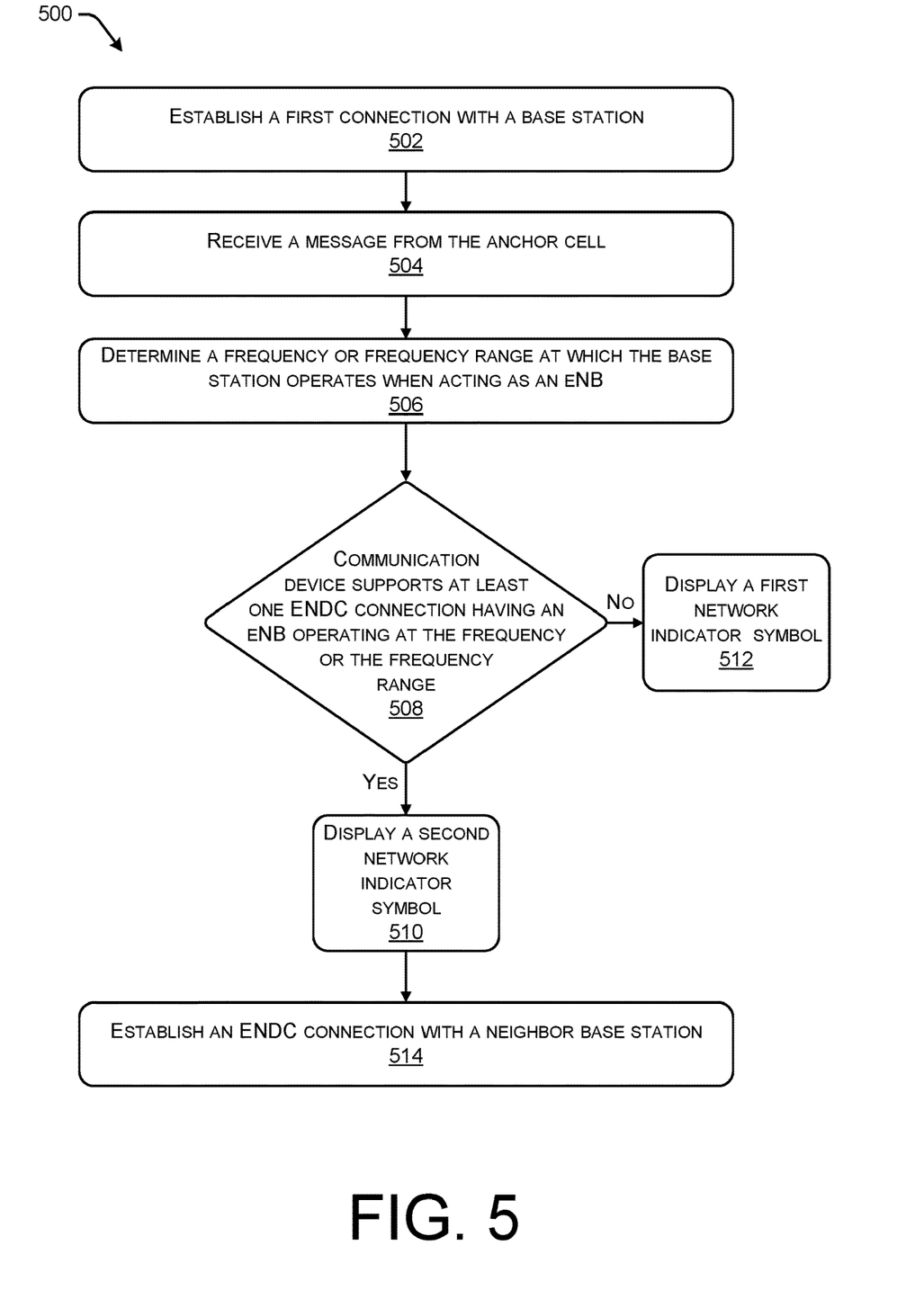
FIG. 5 is another example process implemented by a communication device for displaying a network indicator symbol indicative of a level of service currently available to a user of the communication device, according to some implementations.
Figure 6:
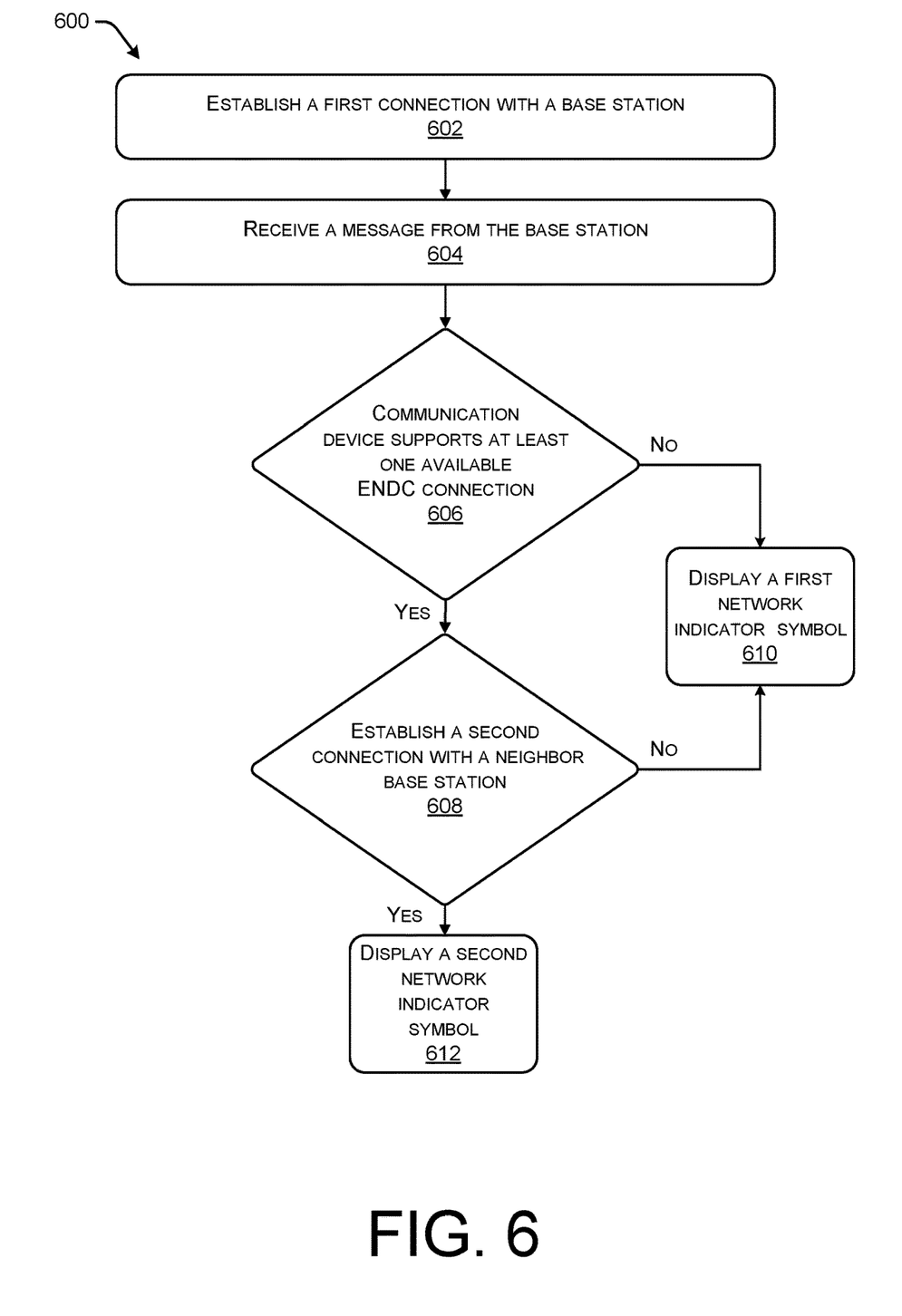
FIG. 6 is another example process implemented by a communication device for displaying a network indicator symbol indicative of a level of service currently available to a user of the communication device, according to some implementations.

FIGS. 4-6 are flow diagrams illustrating example processes associated with the processes for displaying status indicator symbols according to some implementations. The processes are illustrated as a collection of blocks in a logical flow diagram, which represent a sequence of operations, some or all of which can be implemented in hardware, software, or a combination thereof. In the context of software, the blocks represent computer-executable instructions stored on one or more computer-readable media that, which when executed by one or more processors, perform the recited operations. Generally, computer-executable instructions include routines, programs, objects, components, encryption, deciphering, compressing, recording, data structures and the like that perform particular functions or implement particular abstract data types.

The order in which the operations are described should not be construed as a limitation. Any number of the described blocks can be combined in any order and/or in parallel to implement the process, or alternative processes, and not all of the blocks need be executed. For discussion purposes, the processes herein are described with reference to the frameworks, architectures and environments described in the examples herein, although the processes may be implemented in a wide variety of other frameworks, architectures or environments.

FIG. 4 is an example process 400 implemented by a communication device, such as communication device 102, 202, or 302 of FIGS. 1-3 above, for displaying a network indicator symbol indicative of a level of service currently available to a user of the communication device, according to some implementations. As discussed above, in some cases, the communication device may connect to a base station or base station configured as an anchor cell (eNB) that may support ENDC. In these cases, the communication device may be able to access the network using both LTE and a 5G capabilities if there is a match between the capabilities of the communication device and the ENDC capabilities of the eNB device and one or more base stations or base station neighboring the eNB device.

At operation 402, the communication device may establish a first connection with a base station capable of acting as an eNB with respect to a neighboring base station. For example, the communication device may establish a LTE based connection to the base station based on a signal strength, physical proximity, as well as other factors typically associated with selecting or establishing a connection to a base station or base station.

At operation 404, the communication device may receive a neighbor base stations capabilities list from the base station via the first connection. For example, the communication device may receive a SIB message indicating that the base station is capable of acting as an eNB for an ENDC. The communication device may also receive a neighbor list from the base station. The neighbor list may specify the various operating frequencies or ranges associated with each neighbor base stations and a list of capabilities of each neighbor station acting as an gNB. In some cases, the base station may compile the neighbor list by querying each of the neighboring base stations for data associated with their respective the ENDC capabilities. The base station may also update the neighbor list on a period basis or in response to a trigger (such as an input from a network operator).

At operation 406, the communication device may determine if the communication device supports at least one ENDC connection associated with the neighbor list. For example, an application layer of the communication device may query a modem for the capabilities of the communication device and compare the results of the query to the contents of the neighbor list.

If there is a match between the capabilities of at least one neighbor base stations and the communication device, the process 400 may advance to operation 408. Otherwise, the process 400 proceeds to operation 410 and, at the operation 410, the communication device may display a first network indicator symbol. The first network indicator symbol may represent to the user that the communication device is connected to the network via a single connectivity type, such as in this example "LTE".

At operation 408, the communication device may display a second network indicator symbol. The second network indicator symbol may represent to the user that the communication device is connected to the network via two different connectivity type, such as in this example "5G LTE", as the communication device has the capabilities to connect to the base station as the eNB and at least one of the neighboring base stations as the gNB via ENDC.

At operation 412, the communication device may establish or attempt to establish a second connection with a neighbor base station. For example, the communication device may select, from the neighbor base stations matching the ENDC capabilities of the communication device, a neighbor device having the strongest signal strength as the neighbor station to form the second connection with. In this example, it should be understood that the base station (e.g., the eNB) acts as the master station or cell and the neighbor station (e.g., the gNB) acts as the slave station or cell with respect to the communication device.

FIG. 5 is another example process 500 implemented by a communication device, such as communication device 102, 202, or 302 of FIGS. 1-3 above, for displaying a network indicator symbol indicative of a level of service currently available to a user of the communication device, according to some implementations. Again, in some situations, the communication device may connect to a base station or base station configured as an anchor cell (eNB) that may support ENDC. In these situations, the communication device may be able to access the network using both LTE and a 5G capabilities.

At operation 502, the communication device may establish a first connection with a base station capable of acting as an eNB with respect to a neighboring base station. For example, the communication device may establish an LTE based connection to the base station based on a signal strength, physical proximity, as well as other factors typically associated with selecting or establishing a connection to a base station or base station.

At operation 504, the communication device may receive a neighbor message from the base station. For example, the communication device may receive a SIB message indicating that the base station is capable of acting as an eNB for an ENDC.

At operation 506, the communication device may determine a frequency or frequency range at which the base station operates when acting as an eNB (e.g., anchor cell or master cell of the ENDC) with respect to one or more neighbor base stations. For example, in some cases, the message may include the frequency or frequency range at which the base station operates when acting as an eNB (e.g., anchor cell or master cell of the ENDC) and the communication device may be configured to extract or parse the frequency or frequency range from the message.

At operation 508, the communication device may determine if the communication device supports at least one ENDC connection having an eNB operating at the frequency or the frequency range. For example, an application layer of the communication device may query a modem for the capabilities of the communication device and compare the results of the query to the contents of the frequency or the frequency range to determine a match.

If there is a match between the frequency or the frequency range of the base station and the communication device, the process 500 may advance to operation 510. Otherwise, the process 500 proceeds to operation 512 and, at the operation 512, the communication device may display a first network indicator symbol. The first network indicator symbol may represent to the user that the communication device is connected to the network via a single connectivity type, such as, in this example, "LTE", as the communication device is unable to utilize the ENDC capabilities currently available via the base station.

At operation 512, the communication device may display a second network indicator symbol. The second network indicator symbol may represent to the user that the communication device is connected to the network via two different connectivity type, such as, in this example, "5G LTE", as is capable of utilizing the ENDC capabilities currently available via the base station (e.g., the communication device has the capabilities to connect to the base station acting as an eNB operating at the frequency or frequency range).

At operation 512, the communication device may establish or attempt to establish a second connection with a neighbor base station. For example, the communication device may select, from the neighbor base stations associated with the eNB operating at the frequency or the frequency range, a neighbor base station having the strongest signal strength as the neighbor station to form the second connection with. Again, in this example, it should be understood that the base station (e.g., the eNB) acts as the master station or cell and the neighbor base station (e.g., the gNB) acts as the slave station or cell with respect to the communication device.

FIG. 6 is another example process 600 implemented by a communication device, such as communication device 102, 202, or 302 of FIGS. 1-3 above, for displaying a network indicator symbol indicative of a level of service currently available to a user of the communication device, according to some implementations. In some cases, while the communication device and the network may have compatible ENDC capabilities, the communication device may still be unable to connect to second network (e.g., the 5G network), such as a result of poor signal quality or a distance between the physical location of the communication device and the physical location of the neighboring base station. In these cases, the communication device may be further configured to delay presentation of the network indicator symbol until the connection to the neighbor base station is established, as discussed below.

At operation 602, the communication device may establish a first connection with a base station capable of acting as an eNB with respect to a neighboring base station. For example, the communication device may establish an LTE based connection to the base station based on a signal strength, physical proximity, as well as other factors typically associated with selecting or establishing a connection to a base station or base station.

At operation 604, the communication device may receive a neighbor message from the base station. For example, the communication device may receive a SIB message indicating that the base station is capable of acting as an eNB for an ENDC.

At operation 606, the communication device may determine if the communication device supports at least one available ENDC connection. For example, an application layer of the communication device may query a modem for the capabilities of the communication device. The communication device may then compare the results to a neighbor list, as discussed above with respect to FIG. 4, and/or compare the results to the operating frequency or the frequency range of the base station, as discussed above with respect to FIG. 5, to determine a match.

If there is a match, the process 600 may proceed to operation 608. Otherwise, the process 600 advances to operation 610 and, at the operation 610, the communication device may display a first network indicator symbol. The first network indicator symbol may represent to the user that the communication device is connected to the network via a single connectivity type, such as, in this example, "LTE", as the communication device is unable to utilize the ENDC capabilities currently available via the base station.

At operation 608, the communication device may attempt to establish a second connection with a neighbor base station. If the communication device is able to establish the connection to the neighbor base station (e.g., the gNB) then the process 600 advances to 612 and, at operation 612, the communication device may display a second network indicator symbol. The second network indicator symbol may represent to the user that the communication device is connected to the network via two different connectivity type, such as, in this example, "5G LTE", as is capable of utilizing the ENDC capabilities currently available via the base station.

Otherwise, if the communication device is unable to establish the second connection with the neighbor base station, the process 600 may proceed to 610 and, at operation 610, the communication device may, again, display the first network indicator symbol, representing to the user that the communication device is connected to the network via a single connectivity type.

Figure 7:
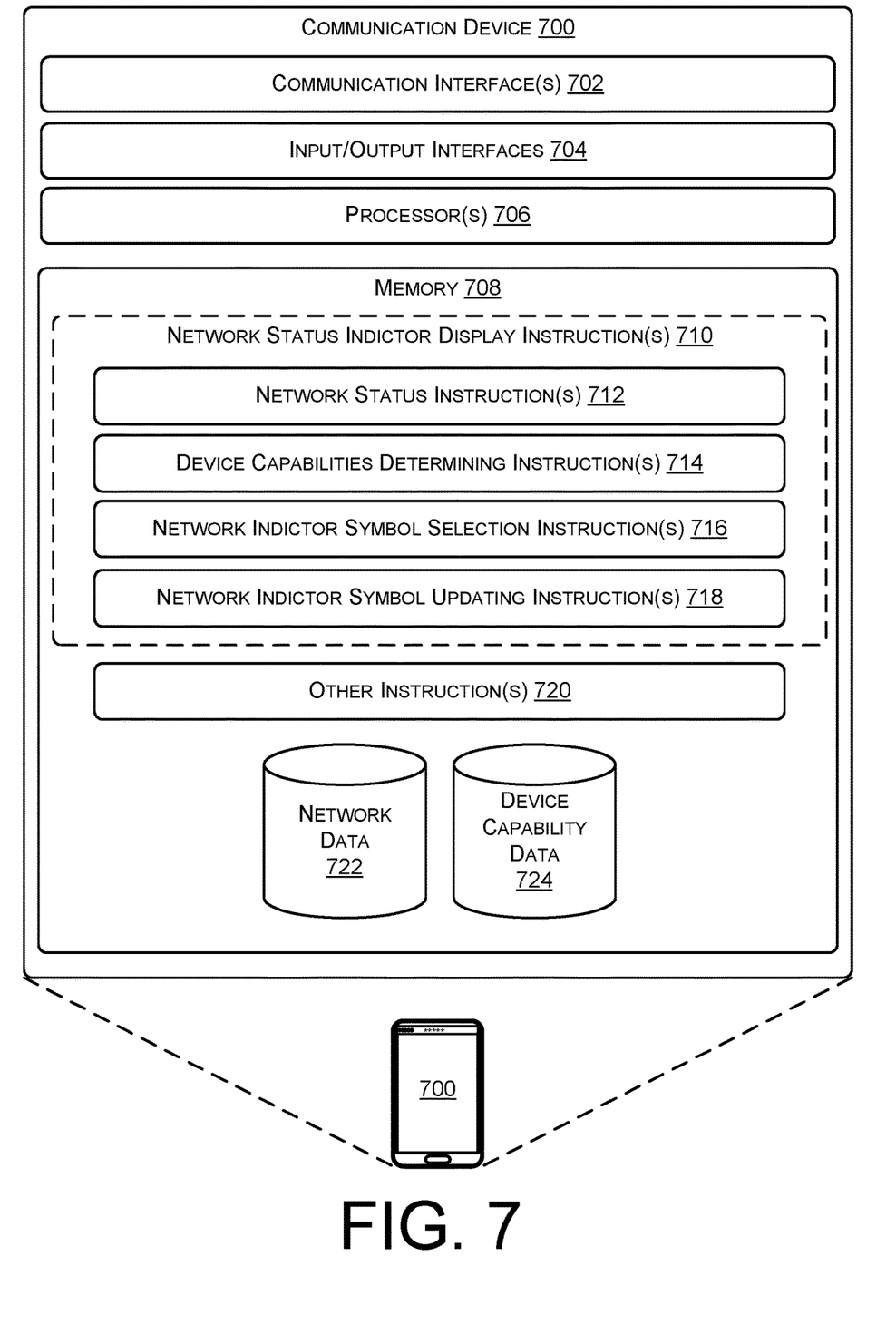
FIG. 7 illustrates an example communication device to implement the network indicator symbol presentation techniques, according to some implementations.

FIG. 7 illustrates an example communication device 700 to implement the network indicator symbol presentation techniques, according to some implementations. In some implementations, the communication device 700 may correspond to the communication devices 102, 202, or 302 described above. It is to be understood that the communication device 700 can be implemented as a single device, as a plurality of devices, or as a system with components and data distributed among the components.

As illustrated, the communication device 700 includes one or more communication interface(s) 702, input/output device(s) 704, and processor(s) 706. The communication device 700 may also comprise a memory 708, storing network status indicator display instructions 710, which is shown, in one example, as comprising network status instructions 712, device capabilities determining instructions 714, network indicator symbol selection instructions 716, and network indicator symbol updating instructions 718. The memory 708 may also store other instruction 720 (labeled as 748 in PDF) and data, such as network data 722 and device capabilities 724.

The communication interface(s) 702 may include one or more wired or wireless transceiver(s). For example, the transceiver(s) can include a network interface card (NIC), a network adapter, a LAN adapter, or a physical, virtual, or logical address to connect to various networks, devices, or components illustrated in the network, for example. To increase throughput when exchanging wireless data, the transceiver(s) can utilize multiple-input/multiple-output (MIMO) technology. The transceiver(s) can comprise any sort of wireless transceivers capable of engaging in wireless, radio frequency (RF) communication. The transceiver(s) can also include other wireless modems, such as a modem for engaging in Wi-Fi, WiMAX, Bluetooth, infrared communication, and the like. In some cases, the communication device 700 may also be configured to communicate over a telecommunications network using any common wireless and/or wired network access technology. For example, the communication interface(s) 702 may also facilitate communication cellular networks, radio frequency based networks, Wi-Fi networks, short-range or near-field networks, local area networks, wide area networks, and so forth.

The input/output interface(s) 704 may include devices, such as a keypad, a cursor control, microphones, voice input device, displays, speakers, printers, and the like. In some cases, the input interface and the output interface may be combined in one or more touch screen capable displays.

The one or more processors 706 may include one or more access components, control logic circuits, central processing units, or processors, and the like. Additionally, each of the processors 706 may itself comprise one or more processors or processing cores.

In various embodiments, the memory 708 may be a volatile (such as RAM), non-volatile (such as ROM, flash memory, etc.) or some combination of the two. Depending on the configuration, the memory 708 may also be an example of tangible non-transitory computer storage media and may include volatile and nonvolatile memory and/or removable and non-removable media implemented in any type of technology for storage of information such as computer-readable instructions or modules, data structures, program modules or other data. Such computer-readable media may include, but is not limited to, RAM, ROM, EEPROM, flash memory or other memory technology, CD-ROM, digital versatile discs (DVD), content-addressable memory (CAM), or other optical storage, magnetic cassettes, magnetic tape, magnetic disk storage or other magnetic storage devices, or any other medium which can be used to store the desired information and which can be accessed by the processors 706.

The network status instructions 712 may be configured to process, parse, or otherwise read messages received from various base stations or base stations, such as those discussed above with respect to FIGS. 1-6. For example, the network status instructions 712 may extract or determine that the base station is capable of acting as an eNB according to an ENDC. The network status instructions 712 may also identify an operating frequency associated with the eNB device and/or a neighbor list received from the eNB.

The device capabilities determining instructions 714 may be configured to determine the capabilities of the device with respect to ENDC connections. For example, the device capabilities determining instructions 714 may either access stored capabilities associated with the device (e.g., from the device capability data 724) or for instance query the capabilities of a component of the device 700 (e.g., a modem or input/output interface 704).

The network indicator symbol selection instructions 716 may be configured to compare the neighbor list, the eNB device operating frequency, and/or the device capabilities to determine if the communication device 700 is capable of connecting to the network using ENDC or NR. The network indicator symbol selection instructions 716 may then cause an appropriate network indicator symbol to be displayed by the input/output interface 704 (e.g., the display of the device 700). For example, if the device capabilities match the capabilities outlined in the neighbor list, the network indicator symbol selection instructions 716 may cause a "5G LTE" indicator to be displayed. Alternatively, if the device capabilities do not match the capabilities outlined in the neighbor list, the network indicator symbol selection instructions 716 may cause a "LTE" indicator to be displayed.

The network indicator symbol updating instructions 718 may be configured to update a displayed network indicator symbol. For example, if the "5G LTE" indicator is displayed but the communication device 700 is unable to maintain a connection to the neighbor base station (such as a result of poor signal strength and/or physical distance between the communication device 700 and the neighbor base station or base station), the network indicator symbol updating instructions 718 may update the "5G LTE" indicator symbol to a "LTE" indicator symbol.

Figure 8:
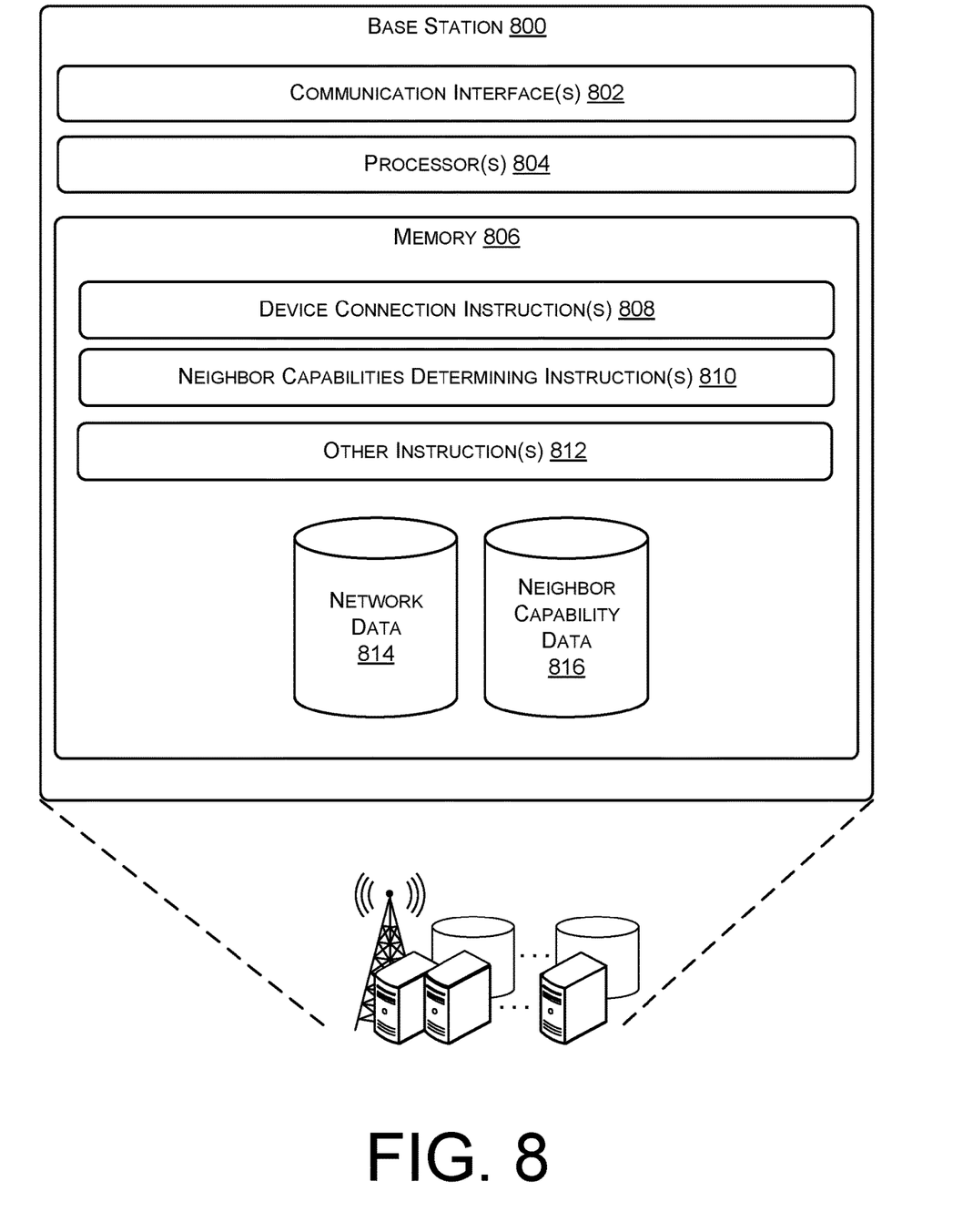
FIG. 8 illustrates an example base station to implement the network indicator symbol presentation techniques, according to some implementations.

FIG. 8 illustrates an example base station 800 to implement the network indicator symbol presentation techniques, according to some implementations. In some embodiments, the base station 800 can correspond to the base station, nodes, or base stations described elsewhere herein. It is to be understood that the base station 800 can be implemented as a single device, as a plurality of devices, or as a system with components and data distributed among them.

The base station 800 may include a communication interface 802, a processor 804, and memory 806. The memory 806 may comprise device connection instructions 808, neighbor capabilities determining instructions 810, as well as other instructions 812. The memory 806 may also store data, such as network data 814 and neighbor capability data 816, as illustrated.

The communication interface(s) 802 may include one or more wired or wireless transceiver(s). For example, the transceiver(s) can include a network interface card (NIC), a network adapter, a LAN adapter, or a physical, virtual, or logical address to connect to various networks, devices, or components illustrated in the network, for example. To increase throughput when exchanging wireless data, the transceiver(s) can utilize MIMO technology. The transceiver(s) can comprise any sort of wireless transceivers capable of engaging in wireless, RF communication. The transceiver(s) can also include other wireless modems, such as a modem for engaging in Wi-Fi, WiMAX, Bluetooth, infrared communication, and the like. In some cases, the communication interface(s) 802 may also be configured to communicate over a telecommunications network using any common wireless and/or wired network access technology. For example, the communication interface(s) 802 may also facilitate communication cellular networks, radio frequency based networks, Wi-Fi networks, short-range or near-field networks, local area networks, wide area networks, and so forth.

The one or more processors 804 may include one or more access components, control logic circuits, central processing units, or processors, and the like. Additionally, each of the processors 804 may itself comprise one or more processors or processing cores.

In various embodiments, the memory 806 may be a volatile (such as RAM), non-volatile (such as ROM, flash memory, etc.) or some combination of the two. Depending on the configuration, the memory 806 may also be an example of tangible non-transitory computer storage media and may include volatile and nonvolatile memory and/or removable and non-removable media implemented in any type of technology for storage of information such as computer-readable instructions or modules, data structures, program modules or other data. Such computer-readable media may include, but is not limited to, RAM, ROM, EEPROM, flash memory or other memory technology, CD-ROM, digital versatile discs (DVD), content-addressable memory (CAM), or other optical storage, magnetic cassettes, magnetic tape, magnetic disk storage or other magnetic storage devices, or any other medium which can be used to store the desired information and which can be accessed by the processors 804.

The device connection instructions 808 may be configured to send various types of messages to one or more communication device(s) that are establishing a connection to a network via the base station 800. In some cases, the messages may be in the form of a SIB message, include operating frequencies associated with the base station 800, and/or include a neighbor list of capabilities associated with an ENDC available via neighbor base stations to the base station 800.

The neighbor capabilities determining instructions 810 may be configured to query, request, or otherwise obtain ENDC capabilities and/or operating frequencies of the neighboring base stations. The neighbor capabilities determining instructions 810 may then generate a neighbors list according the neighbor's capabilities. The neighbor capabilities determining instructions 810 may then store the neighbor list as part of the neighbor capability data 816 or otherwise make available to the device connection instructions 808 for sending to the various communication devices accessing the network via the base station 800.

FIGS. 1-5 illustrate example processes in accordance with embodiments of the disclosure. These processes are illustrated as logical flow graphs, each operation of which represents a sequence of operations that can be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the processes.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A computer-implemented method comprising:
 establishing, by a communication device, a connection to a network node associated with Long Term Evolution (LTE) wireless communication technology, wherein the network node is associated with a frequency capable of supporting Fifth Generation (5G) wireless communication technology;
 accessing, by the communication device, one or more capabilities of the communication device;
 determining, by the communication device and based at least in part on the one or more capabilities of the communication device, that the communication device is capable of supporting non-standalone E-UTRAN New Radio Dual Connectivity (ENDC), wherein determining that the communication device is capable of supporting non-standalone ENDC comprises determining that the communication device supports non-standalone ENDC connections having an anchor node operating within the frequency capable of supporting the 5G wireless communication technology; and presenting, by the communication device and based at least in part on determining that the communication device is capable of supporting non-standalone ENDC, a graphical representation indicating that the 5G wireless communication technology is available.

2. The computer-implemented method of claim 1, further comprising:
receiving, by the communication device and from the network node, a list of neighboring network cells and frequencies associated with individual ones of the neighboring network cells; and
determining, by the communication device and based at least in part on the list, that the network node is associated with the frequency capable of supporting the 5G wireless communication technology.

3. The computer-implemented method of claim 2, further comprising presenting the graphical representation further based at least in part on determining that the network node is associated with the frequency capable of supporting the 5G wireless communication technology.

4. The computer-implemented method of claim 1, further comprising presenting, by the communication device, a different graphical representation indicating that LTE wireless communication technology is available until the graphical representation is presented.

5. The computer-implemented method of claim 1, further comprising concurrently presenting, by the communication device, that a graphical representation indicating that LTE wireless communication technology is available and the graphical representation indicating that the 5G wireless communication technology is available.

6. The computer-implemented method of claim 1, further comprising:
determining, by the communication device, a signal strength associated with the 5G wireless communication technology; and
presenting, by the communication device, the graphical representation only if the signal strength meets or exceeds a threshold.

7. A communication device comprising:
a user interface (UI) to receive inputs from a user;
a display;
a first transceiver to send and receive transmissions over a first communication connection to a first base station, the first base station associated with a network;
a second transceiver to send and receive transmissions over a second communication connection to a second base station, the second base station associated with the network;
one or more processors;
non-transitory computer-readable media storing computer-executable instructions, which when executed by the one or more processors cause the one or more processors to perform operations including:
receiving, in part via the first communication connection, an indication that the first base station is capable of supporting non-standalone E-UTRAN New Radio Dual Connectivity (ENDC) capabilities and an operating frequency range at which the first communication device operates in regards to the ENDC capabilities;
receiving, in part via the first communication connection, a neighbor list from the first base station, the neighbor list including data representing ENDC capabilities supported by the second base station;
determining that the communication device is capable of supporting at least one communication connection that includes an Evolved Node B (eNB) operating within the frequency range; and
presenting, on the display and based at least in part on determining that the communication device is capable of supporting the at least one communication connection that includes an eNB operating within the frequency range, a graphical representation indicating that the ENDC communication technology is available,
wherein presenting the graphical representation indicating that the ENDC communication technology is available is based at least in part on determining that the communication device is capable of supporting a gNB having the ENDC capabilities, and
wherein the determining that the communication device is capable of supporting the gNB having the ENDC capabilities includes accessing, by an application layer of the communication device, the capabilities of the second transceiver.

8. The communication device of claim 7, wherein the neighbor list includes data representing ENDC capabilities supported by at least one additional base station within range of the first base station.

9. The communication device of claim 7, wherein the first communication connection is associated with a Long Term Evolution (LTE) wireless communication technology and the second communication connection is associated with a Fifth Generation (5G) wireless communication technology.

10. The communication device of claim 7, wherein the graphical representation indicating that the ENDC communication technology is available includes a graphical representation indicating that a Fifth Generation (5G) wireless communication technology is available and a Long Term Evolution (LTE) wireless communication technology is available.

11. The communication device of claim 7, wherein the second transceiver and the first transceiver are a single component.

12. The communication device of claim 7, wherein the first transceiver is associated with a Long Term Evolution (LTE) wireless communication technology and second transceiver is associated with a New Radio (NR) wireless communication technology.

13. A computer-implemented method comprising:
establishing, by a communication device, a first connection to a first network node, the first connection associated with a first wireless communication technology;
receiving, via the first connection, an indication that the first network node is capable of supporting non-standalone E-UTRAN New Radio Dual Connectivity (ENDC) capabilities and an operating frequency range associated with the ENDC capabilities;
accessing, by the communication device, one or more capabilities of the communication device;
determining, by the communication device and based at least in part on the one or more capabilities of the communication device, that the communication device supports ENDC connections associated with the first network node, wherein determining that the communication device supports the ENDC connections associated with the first network node comprises determining that the communication device supports ENDC connections having an anchor node operating within the frequency range; and presenting, on a display of the communication device, a graphical representation indicating that the ENDC communication technology is available.

14. The computer-implemented method of claim 13, wherein the graphical representation indicates that both a Long Term Evolution (LTE) wireless communication technology is available and that a Fifth Generation (5G) wireless communication technology is available.

15. The computer-implemented method of claim 13, further comprising:
receiving, in part via the first connection, data representing ENDC capabilities supported by one or more second network nodes communicatively coupled to the first network node using a New Radio (NR) wireless communication technology; and
wherein determining that the communication device supports the ENDC connections associated with the first network node comprises determining that the communication device supports ENDC connections with one or more of the second network nodes based at least in part on the data representing the ENDC capabilities supported by one or more second network nodes.

16. The computer-implemented method of claim 15, further comprising:
determining ENDC capabilities supported by the communication device; and
wherein determining that the communication device supports ENDC connections with one or more of the second network nodes includes comparing the ENDC capabilities supported by the communication device to the data representing the ENDC capabilities supported by one or more second network nodes.

17. The computer-implemented method of claim 16, wherein determining ENDC capabilities supported by the communication device includes an application layer operating on the communication device querying capabilities of a modem associated with the communication device.

* * * * *